United States Patent
Inoue et al.

(10) Patent No.: US 7,624,610 B2
(45) Date of Patent: Dec. 1, 2009

(54) THIN PLATE FORMATION METHOD, THIN PLATE AND SUSPENSION CORRECTION APPARATUS, AND CORRECTION METHOD

(75) Inventors: Masaru Inoue, Kanagawa (JP); Hiroshi Kawamata, Kanagawa (JP); Hironori Tanaka, Kanagawa (JP)

(73) Assignee: NHK Spring Co., Ltd., Yokohama (JP)

( * ) Notice: Subject to any disclaimer, the term of this patent is extended or adjusted under 35 U.S.C. 154(b) by 71 days.

(21) Appl. No.: 10/646,818

(22) Filed: Aug. 25, 2003

(65) Prior Publication Data

US 2004/0037011 A1  Feb. 26, 2004

(30) Foreign Application Priority Data

Aug. 26, 2002 (JP) ............... 2002-245887

(51) Int. Cl.
*G11B 5/48* (2006.01)
(52) U.S. Cl. ............. 72/342.1; 72/342.94; 29/603.12
(58) Field of Classification Search ............ 219/121.6, 219/121.61, 121.62, 121.81, 121.85; 360/234.3, 360/244.2, 290; 72/342.1, 342.94; 29/603.12
See application file for complete search history.

(56) References Cited

U.S. PATENT DOCUMENTS

| | | | | |
|---|---|---|---|---|
| 4,330,363 | A | * | 5/1982 | Biegesen et al. .......... 117/54 |
| 4,691,241 | A | * | 9/1987 | Tomohisa et al. .......... 358/409 |
| 5,177,343 | A | * | 1/1993 | Takenaka .............. 235/436 |
| 5,355,252 | A | * | 10/1994 | Haraguchi .............. 359/369 |
| 5,622,567 | A | * | 4/1997 | Kojima et al. ........... 118/726 |
| 5,712,463 | A | * | 1/1998 | Singh et al. ............ 219/121.6 |
| 5,719,374 | A | * | 2/1998 | Frackiewicz et al. ... 219/121.66 |
| 6,011,239 | A | * | 1/2000 | Singh et al. ............ 219/121.6 |
| 6,058,132 | A |   | 5/2000 | Iso et al. .............. 372/108 |
| 6,086,773 | A | * | 7/2000 | Dufresne et al. ............ 216/8 |
| 6,441,385 | B1 | * | 8/2002 | Khlif .................. 250/548 |
| 6,640,604 | B2 | * | 11/2003 | Matsushita ............. 72/342.1 |
| 6,806,723 | B2 | * | 10/2004 | Maruyama et al. ......... 324/754 |
| 6,837,092 | B1 | * | 1/2005 | Ubl et al. .............. 72/342.1 |
| 6,984,802 | B2 | * | 1/2006 | Kuroiwa et al. ......... 219/121.73 |
| 7,021,097 | B1 | * | 4/2006 | Ubl et al. .............. 72/31.1 |
| 2002/0108427 | A1 | * | 8/2002 | Matsushita ............. 72/342.1 |
| 2003/0021067 | A1 | * | 1/2003 | Chang et al. ............ 360/234.3 |

(Continued)

FOREIGN PATENT DOCUMENTS

CN  1199661 A  11/1998

(Continued)

OTHER PUBLICATIONS

Chinese Office Action dated Sep. 15, 2006, including a partial English-language translation.

(Continued)

*Primary Examiner*—Samuel M Heinrich
(74) *Attorney, Agent, or Firm*—Edwards Angell Palmer & Dodge LLP

(57) ABSTRACT

Laser beam irradiation areas are provided in a load curve portion and an angle adjustment portion of a suspension. The laser beam irradiation areas are oriented in a direction in which the suspension is to be bent. A laser beam having a predetermined length and a predetermined shape is irradiated onto each laser beam irradiation area.

2 Claims, 12 Drawing Sheets

U.S. PATENT DOCUMENTS

| | | | |
|---|---|---|---|
| 2003/0154005 A1* | 8/2003 | Wong et al. | 700/279 |
| 2004/0074879 A1* | 4/2004 | Shang | 219/121.6 |
| 2006/0130552 A1* | 6/2006 | Ubl et al. | 72/342.1 |

FOREIGN PATENT DOCUMENTS

| | | |
|---|---|---|
| JP | 60-231524 | 11/1985 |
| JP | 01-227279 | 9/1989 |
| JP | 05-189906 | 7/1993 |
| JP | 06-114443 | 4/1994 |
| JP | 7-77063 | 8/1995 |
| JP | 10-277650 | 10/1998 |
| JP | 2000-339894 | 12/2000 |

OTHER PUBLICATIONS

Japanese Office Action issued Jan. 20, 2009 in corresponding Japanese Patent Application No. 2002-245887.

* cited by examiner

FIG.8
PRINT EXAMPLE
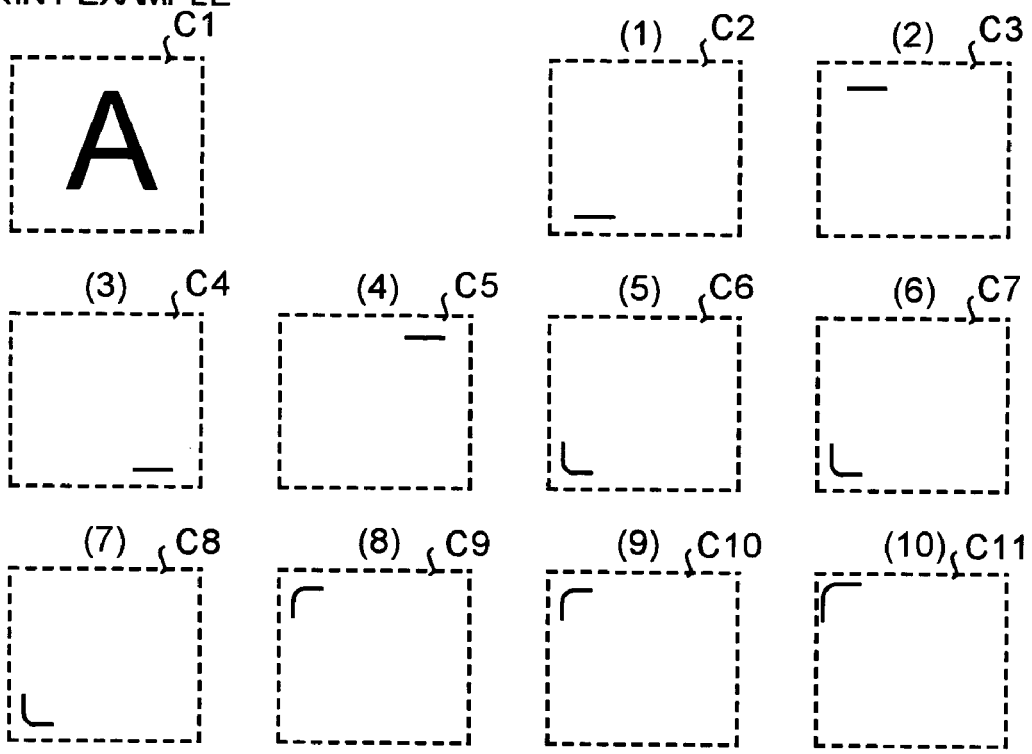
COMBINATION EXAMPLE
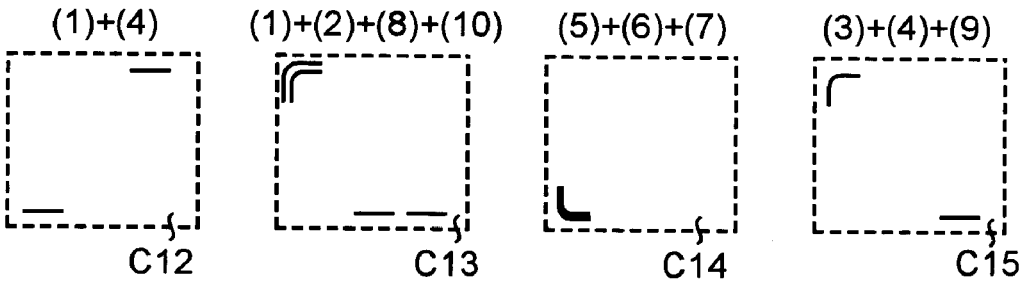

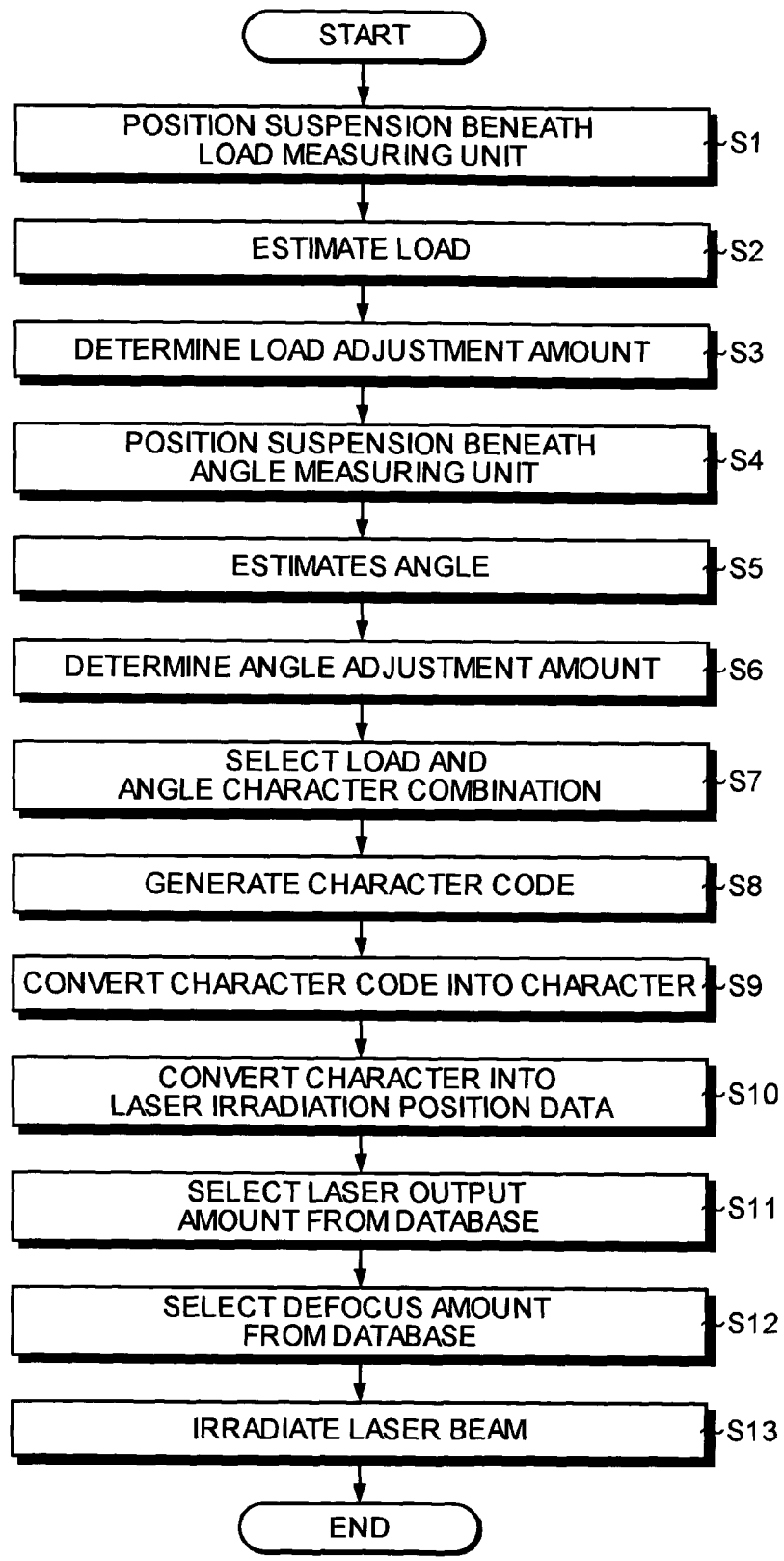

THIN PLATE FORMATION METHOD, THIN PLATE AND SUSPENSION CORRECTION APPARATUS, AND CORRECTION METHOD

BACKGROUND OF THE INVENTION

1). Field of the Invention

The present invention relates to a technology for correcting load and an angle of a suspension that supports a magnetic head slider of a hard disk drive.

2). Description of the Related Art

Recording densities of the hard disk drives have improved remarkably. As a result, the suspensions that supports the magnetic head in the hard disk drives needs to be manufactured with more precision than ever before.

The magnetic head is pressed against the magnetic disk while the magnetic disk is rotating. As a result, the magnetic head flies aerodynamically at a predetermined distance from the disk. The load, the fine roll angle, and the pitch angle of the suspension greatly affect the flying of the magnetic head. The load, the roll angle, and the pitch angle of each suspension are corrected during the manufacturing process.

A conventional approach to correct the load, the roll angle, and the pitch angle of the suspension is to correct them mechanically. Precisely, an outrigger of a flexure that holds the magnetic head is held mechanically, for example, by tool, and the outrigger is bent or twist in an appropriate direction. However, this approach requires a tool having an appropriate shape to hold the outrigger and a mechanism to move the tool. Thus, this approach is costly and troublesome.

Another conventional approach to correct the load, the roll angle, and the pitch angle of the suspension is to thermally deform the suspension by irradiating a laser beam to the suspension. This technique is disclosed, for example, in Japanese Patent Application Laid-open Publication No. 2000-339894 and Japanese Patent Application Laid-open Publication No. H7-77063.

According to the technique disclosed in Japanese Patent Application Laid-open Publication No. 2000-339894, the outrigger is scanned with a laser beam in a direction that is perpendicularly or oblique (i.e., a flexure width direction) to the arm longitudinal direction. The outrigger bends due to the thermal energy of the laser beam. In this manner, the roll angle and the pitch angle of the suspension can be corrected. Particularly, the laser beam is irradiated on the outrigger from a direction approximately perpendicular to a direction of curvature of the outrigger, moreover, the laser beam is made to enter from one end of the outrigger, scan the outrigger, and go out from the other end of the outrigger.

According to the technique disclosed in Japanese Patent Application Laid-open Publication No. H7-77063, a laser beam is irradiated to a width direction of a spring arm, thereby to correct the load and obtain a prescribed contact pressure. Even in this technique, the laser beam is made to enter from one end of the spring arm, scan the spring arm, go out from the other end of the spring arm.

Thus, in the conventional approaches, the laser beam is irradiated from a direction that is approximately perpendicularly or oblique to the direction in which the suspension is curved. As a result, it is difficult to control bending of the suspension with precision. In other words, when the suspension is looked at from a lateral direction, the outrigger is bent with the laser beam-scanned portion as a fulcrum. As a result, an error in the position of the scanning is amplified largely at the end portion of the suspension. Despite the necessity for forming the suspension in extremely high precision, it is difficult in the conventional approaches to carrying out a fine correction of the load, the roll angle, and the pitch angle of the suspension, or the conventional techniques require correction and inspection to be repeated many times. This leads to low productivity.

SUMMARY OF THE INVENTION

It is an object of the present invention to at least solve the problems in the conventional technology.

The method according to one aspect of the present invention is of bending a thin plate in a predetermined direction by irradiating a laser beam onto the thin plate. The method comprises irradiating a laser beam linearly onto the thin plate in approximately the predetermined direction.

The method according to another aspect of the present invention is of bending a thin plate using a laser beam, wherein the laser beam is irradiated onto the thin plate to curve the thin plate.

The method according to still another aspect of the present invention is of correcting a suspension used to mount a magnetic head in a hard disk drive. The method comprises either one of or both measuring load on the suspension and obtaining a load adjustment amount from the measured load; and measuring an angle of the suspension and obtaining an angle adjustment amount from the measured angle; defining, by using irradiation shapes in advance, that a laser beam is linearly irradiated onto either one of or both a load curve portion and an angle adjustment portion of the suspension in approximately the same direction as a curving direction, preparing combinations of irradiation shapes in advance, and selecting an irradiation shape combination corresponding to either one of or both the load adjustment amount and the angle adjustment amount; and irradiating a laser beam based on the selected irradiation shape combination.

The suspension correction method according to still another aspect of the present invention is of adjusting an angle of the suspension by irradiating a laser beam onto a laser beam irradiation area for correcting an angle in plus or a laser beam irradiation area for correcting an angle in minus, based on an arrangement that the suspension is formed in a thin plate shape as a whole, the header is connected to an outrigger from one end of a head mounting portion via a spring, and the outrigger consists of a curve portion reaching both sides of the head mounting portion, and a linear portion that continues from the curve portion, and an XY axis is set around the head mounting portion, an area I to an area IV are formed on the XY coordinates with the X axis as a gimbal longitudinal direction, and the laser beam irradiation area for correcting the angle in plus or the laser beam irradiation area for correcting the angle in minus is set in the area I and the area III or the area II and the area IV respectively.

The suspension correction method according to still another aspect of the present invention is of adjusting an angle of the suspension by irradiating a laser beam onto a laser beam irradiation area for correcting a pitch angle in plus or a laser beam irradiation area for correcting a pitch angle in minus, based on an arrangement that the suspension is formed in a thin plate shape as a whole, the header is connected to an outrigger from one end of a head mounting portion via a spring, and the outrigger consists of a curve portion reaching both sides of the head mounting portion, and a linear portion that continues from the curve portion, and a boundary is provided in a direction orthogonal with a gimbal longitudinal direction around the spring, a first area is formed at the head mounting side, a second area is formed at the opposite side, the laser beam irradiation area for correcting the pitch angle in plus is set in the first area, and the laser beam irradiation area for correcting the pitch angle in minus is set in the second area.

The thin plate according to still another aspect of the present invention has at least one portion thereof formed in a curve and beam shape, and has a laser beam irradiation trajectory linearly formed in approximately the same direction as the curve direction.

The apparatus for correcting a suspension used to mount a magnetic head in a hard disk drive according to still another aspect of the present invention comprises either one of or both a load measuring unit that measures a load on the suspension; and an angle measuring unit that measures an angle of the suspension; a laser beam irradiating unit that irradiates a laser beam in approximately the same direction as a curving direction onto either one of or both load correction area and an angle correction area of the suspension, based on either one of or both the load measured by the load measuring unit and the angle measured by the angle measuring unit; and a conveyer unit that fixes the suspension onto a conveyer stage, and conveys the suspension while positioning the suspension on either one of or both the load measuring unit and the angle measuring unit, and the laser beam irradiating unit.

The computer program that makes a computer according to still another aspect of the present invention executes either one of or both defining, by using irradiation shapes in advance, that a laser beam is linearly irradiated onto any one part of a load curve portion of a suspension in approximately the same direction as a curving direction, and preparing combinations of irradiation shapes in advance; and defining, by using irradiation shapes in advance, that a laser beam is linearly irradiated onto any one part of an angle adjustment portion of a suspension in approximately the same direction as a curving direction, and preparing combinations of irradiation shapes in advance; and a selecting step of selecting an irradiation shape combination corresponding to either one of or both the load adjustment amount and the angle adjustment amount obtained from a measured load of a head of a hard disk drive that presses against a disk in the hard disk drive, and using the selected combination to irradiate the laser beam.

The other objects, features and advantages of the present invention are specifically set forth in or will become apparent from the following detailed descriptions of the invention when read in conjunction with the accompanying drawings.

BRIEF DESCRIPTION OF THE DRAWINGS

FIG. 8 is an explanatory view of one example of a character when a laser beam irradiation shape is registered as a character;

FIG. 9 is a flowchart of a suspension correction process;

DETAILED DESCRIPTION

Exemplary embodiments of to the present invention will be explained in detail below with reference to the accompanying drawings. However, the present invention is not limited to these embodiments. Constituent elements in the embodiments include those which a person skilled in the art could easily conceive, or those which are substantially identical to each other.

Figure 1:
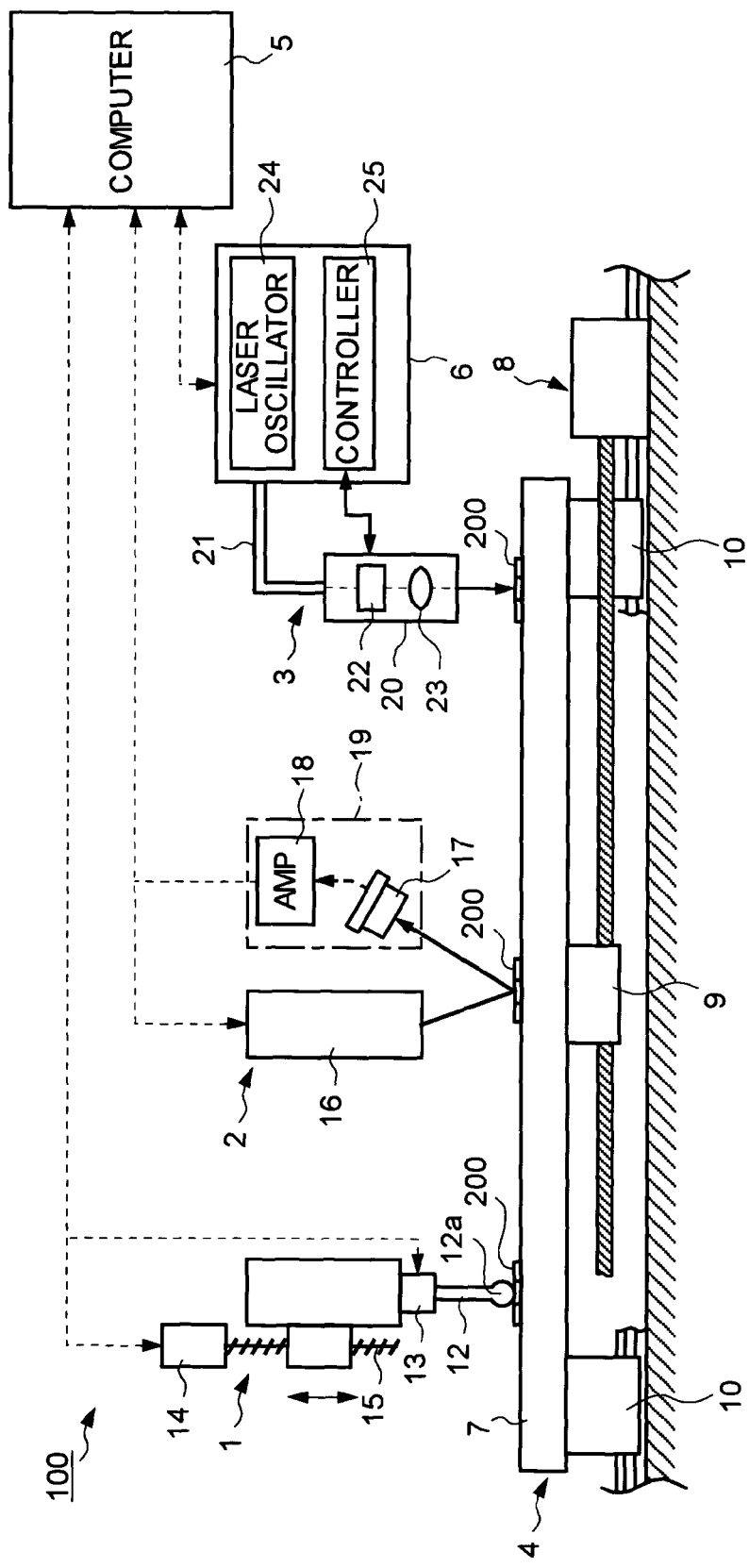
FIG. 1 is a structure diagram of a suspension correction apparatus according to a first embodiment of the present invention.
Figure 2:
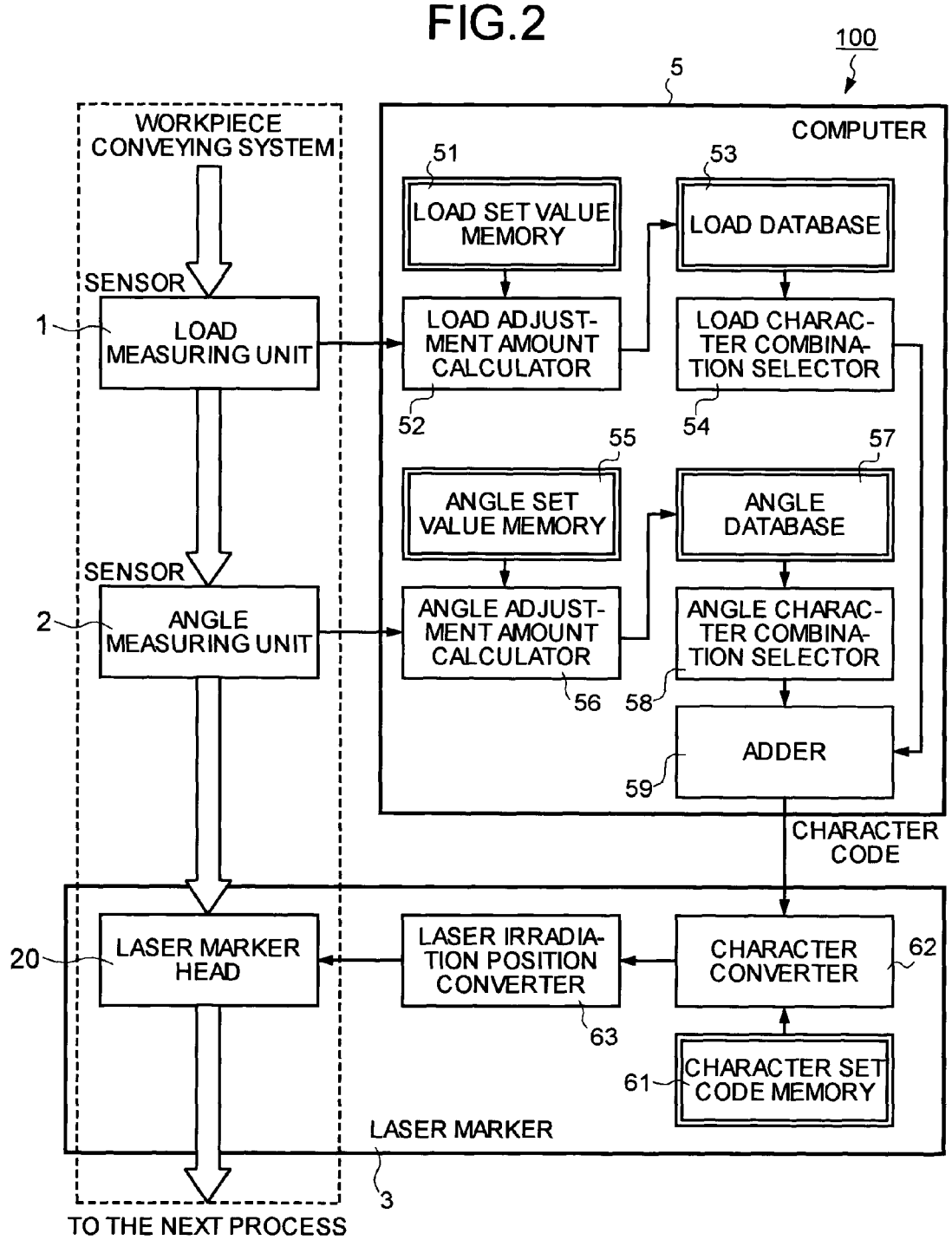
FIG. 2 is a block diagram of a structure of the suspension correction apparatus shown in FIG. 1.
Figure 3:
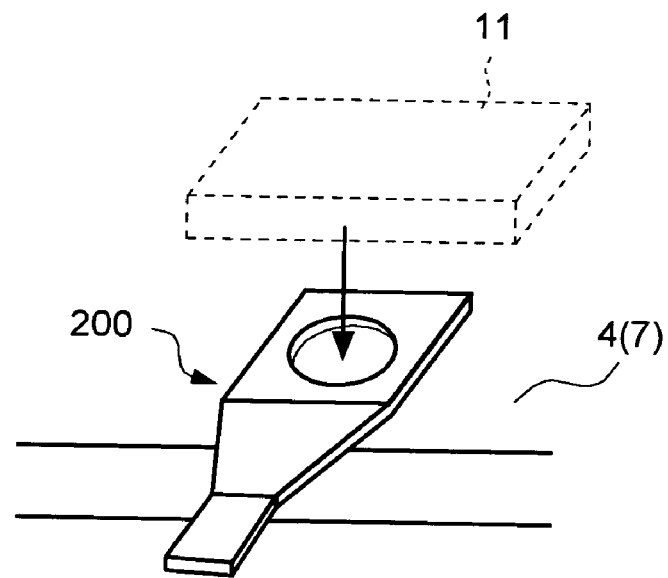
FIG. 3 is an explanatory view of a suspension fixed to a correction apparatus.

FIG. 1 is a structure diagram of a suspension correction apparatus 100 according to a first embodiment of the present invention. FIG. 2 is a block diagram of the suspension correction apparatus 100. FIG. 3 is an explanatory view of a suspension fixed to the suspension correction apparatus 100.

The suspension correction apparatus 100 has a load measuring unit 1, an angle measuring unit 2, a laser marker 3, a conveyer 4 that conveys suspensions 200, a computer 5 for control, and a laser marker main body 6. Although the laser marker 3 is preferable, any other means that can irradiate a laser beam is sufficient.

The suspensions 200 are provisionally fixed at an appropriate distance onto a conveyer stage 7 of the conveyer 4. The conveyer 4 is moved so that one suspension 200 is positioned beneath the load measuring unit 1, the angle measuring unit 2, and the laser marker 3 respectively. A servomotor 8, a ball screw 9, and a direct-acting guide 10 control the move of the conveyer stage 7. To fix the suspension 200 onto the conveyer stage 7, the suspension 200 is sandwiched between a tool 11 (see FIG. 3) and the conveyer stage 7, for example. Other means such as an absorber, a bolt, a magnet, for example, may be used instead of the tool 11. Controllers (not shown) for the conveyer stage 7 and the tool 11 are respectively connected to the computer 5. The computer carries out the entire control.

The load measuring unit 1 consists of a probe 12 that presses a specific portion of the suspension 200, and a load cell 13 provided on the probe 12. The probe 12 is moved up and down with a combination of a servo motor 14 or a stepping motor having a direct-acting guide, and a ball 15, or with an up-and-down moving actuator consisting of a hydraulic cylinder not shown. A front end 12a of the probe 12 is approximately spherical, and is pressed against a magnetic head mounting portion of the suspension 200. The pressure exerted by the probe 12 on the suspension is constant, and an output signal (i.e., voltage) from a load cell 13 is sent to the computer 5. The computer 5 estimates the load on the suspension 200 based on the signal from the load cell 13.

The angle measuring unit 2 consists of a laser beam source 16 that irradiates a laser beam onto a magnetic head mounting portion of the suspension 200, and a light receiver 19. The light receiver 19 includes a charge-coupled device (CCD) 17 and an amplifier (AMP) 18. The CCD 17 sends a signal to the computer 5, via the amplifier 18. The computer estimates an angle of curvature of the suspension 200 at a position of a reflection beam of the laser beam. The load measuring unit 1 and the angle measuring unit 2 are located at the upstream of the correction process of the laser marker 3.

A general laser marker irradiates a laser beam onto a work piece to vaporize, modify or discolor the workpiece surface according to absorption fever, thereby to differentiate between the appearance of the laser beam-irradiated portion and the appearance of a laser beam non-irradiated portion. According to the present invention, as the laser marker 3 is used, it is preferable to use the original application of the marker, although the application is not limited to this method. In other words, it is sufficient to register in advance a laser beam irradiation shape such as a character as a mark (i.e., font) on the suspension 200. When the workpiece surface is processed while feeding it at a predetermined pitch like a usual mark (for example, when a character is formed at a predetermined pitch to write a sentence), it is not possible to irradiate a laser beam using a combination of a plurality of irradiation shapes. Therefore, a laser beam is irradiated in a state of a pitch "0".

The laser marker 3 consists of a laser marker head 20, and the laser marker main body 6 that is connected to the laser marker head 20 via an optical fiber 21. A laser beam emitted from the main body of the laser marker 3 is transmitted through the optical fiber 21, and is irradiated from the laser marker head 20 to the suspension 200. The laser marker head 20 polarizes the laser beam with a galvano scanner mirror 22 in the XY directions, and irradiates an energy-condensed laser beam to the suspension 200 with a condenser 23.

The laser marker main body 6 incorporates a laser oscillator 24 and a controller 25. The laser oscillator 24 emits a laser beam by exciting an oscillation medium, such as a YAG laser, for example, with a flash lamp or a laser diode (LD). The controller 25 controls the laser marker head 20 to irradiate the laser beam onto a specific position by synchronizing the laser oscillation with the mirror driving. Particularly, the laser diameter can be made small by using a single mode laser, and therefore, it is possible to securely irradiate a narrow portion between wires as described later. When a laser beam from a galvano head is condensed with a long focal length lens thereby to obtain a deep depth of focus, the energy density of the laser beam changes little even when a distance between the laser marker head 20 and the suspension 200 changes. Therefore, it is not necessary to fine-control the focal length.

The computer 5 has a load set value memory 51 that stores a load set value required for the suspension 200, a load adjustment amount calculator 52 that calculates a load adjustment amount by comparing the output signal from the load measuring unit 1 with the load set value, a load database 53 that stores combinations of load characters (i.e., irradiation shapes) corresponding to each load, and a load character combination selector 54 that selects a specific combination of load characters from among the combinations of the load characters to correct load to a proper value.

The computer 5 further has an angle set value memory 55 that stores an angle set value required for the suspension 200, an angle adjustment amount calculator 56 that calculates an angle adjustment amount by comparing the output signal from the angle measuring unit 2 with the angle set value, an angle database 57 that stores combinations of angle characters (i.e., irradiation shapes) corresponding to each angle, and an angle character combination selector 58 that selects a specific combination of angle characters from among the combinations of the angle characters to correct an angle to a proper value. The computer 5 further has an adder 59 that adds a load character selected by the load character combination selector 54, and an angle character selected by the angle character combination selector 58. The computer 5 realizes the functions of these sections with hardware including a CPU of the computer, memories, etc., and predetermined software.

The controller 25 of the laser marker main body 6 has a character set code memory 61 that stores a character set code, a character converter 62 that decodes a character by referring to a character set code, and converts the character into shape information, and a laser beam irradiation position converter 63 that converts the information about the converted shape into a positional shape to be actually irradiated with a laser beam. The character converter 62 and the laser beam irradiation position converter 63 can be structured to have similar functions according to a general-purpose computer and predetermined software.

Figure 4:
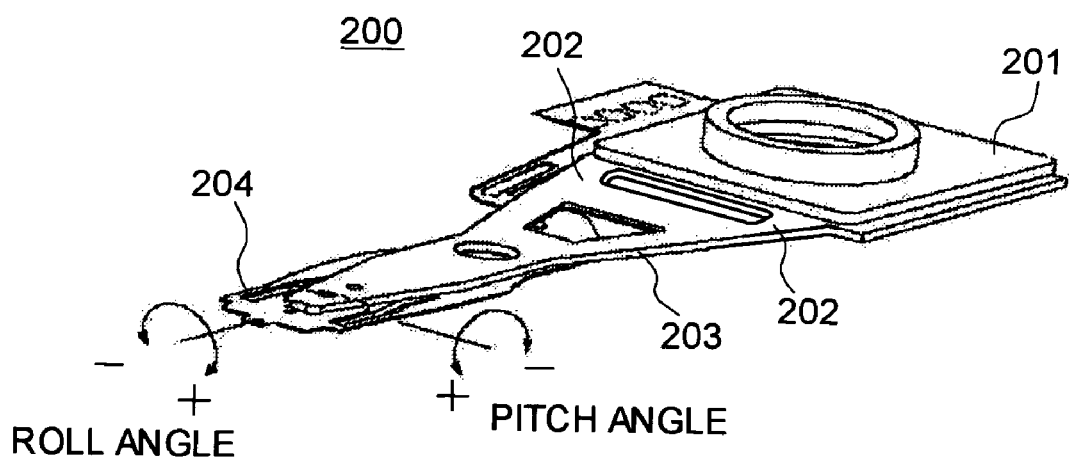
FIG. 4 is a perspective view of one example of a suspension to be corrected by the suspension correction apparatus shown in FIG. 1 or FIG. 2.

FIG. 4 is a perspective view of one example of the suspension 200. This suspension 200 has a load beam 203 provided on a base plate 201 via a load curve portion 202. A flexure 204 is spot welded on a front end of the load beam 203 via a load arm fitter 207 (see FIG. 5). The flexure 204 includes a gimbal spring 205 (see FIG. 6), outriggers 206 and 206, and a magnetic head mounting portion 208. The magnetic head mounting portion 208 is in contact with a dimple 208a formed on the front end of the load beam. The dimple 208a is positioned at approximately the center of the head when the head is mounted.

The flexure 204 is formed by etching or punching a stainless plate in a predetermined shape. A slider 209 for flying is provided on the magnetic head mounting portion 208, with a magnetic head 210 provided on the end of the slider 209, as indicated by a dotted line in the drawing. The base plate 201 and the load beam 203 need not be formed integrally, but may have a structure having separate members spot welded. In this case, the load beam 203 and the load curve portion 202 are integrated, and a part of or the whole load curve portion 202 can be structured to have a small plate thickness by partial etching or the like. Alternatively, the load curve portion 202 as a separate unit may be fixed to the load beam 203 in a hinged shape. The load curve portion 202 may be fixed to the base plate 201 by spot welding.

The load curve portion 202 is curved in a pitch direction in advance by pressing or the like to obtain proper load on the head mounting portion 208. As the suspension 200 is mechanically curved as described above, the load needs to be corrected so that it is properly applied to the head mounting portion 208. The angle of the head mounting portion 208 also needs to be corrected to obtain a proper angle relative to a disk in the hard disk drive.

Figure 5:
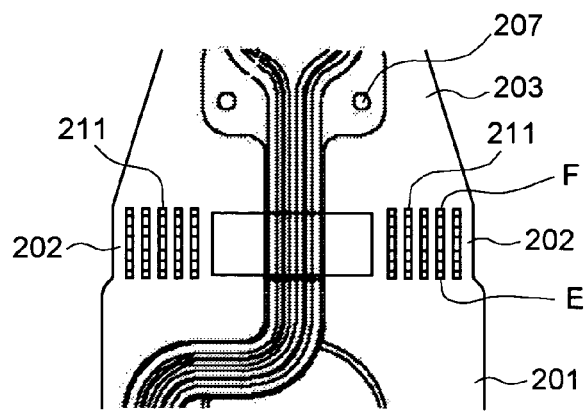
FIG. 5 is an explanatory view of a laser beam irradiation area on a load curve portion of a suspension.
Figure 6:
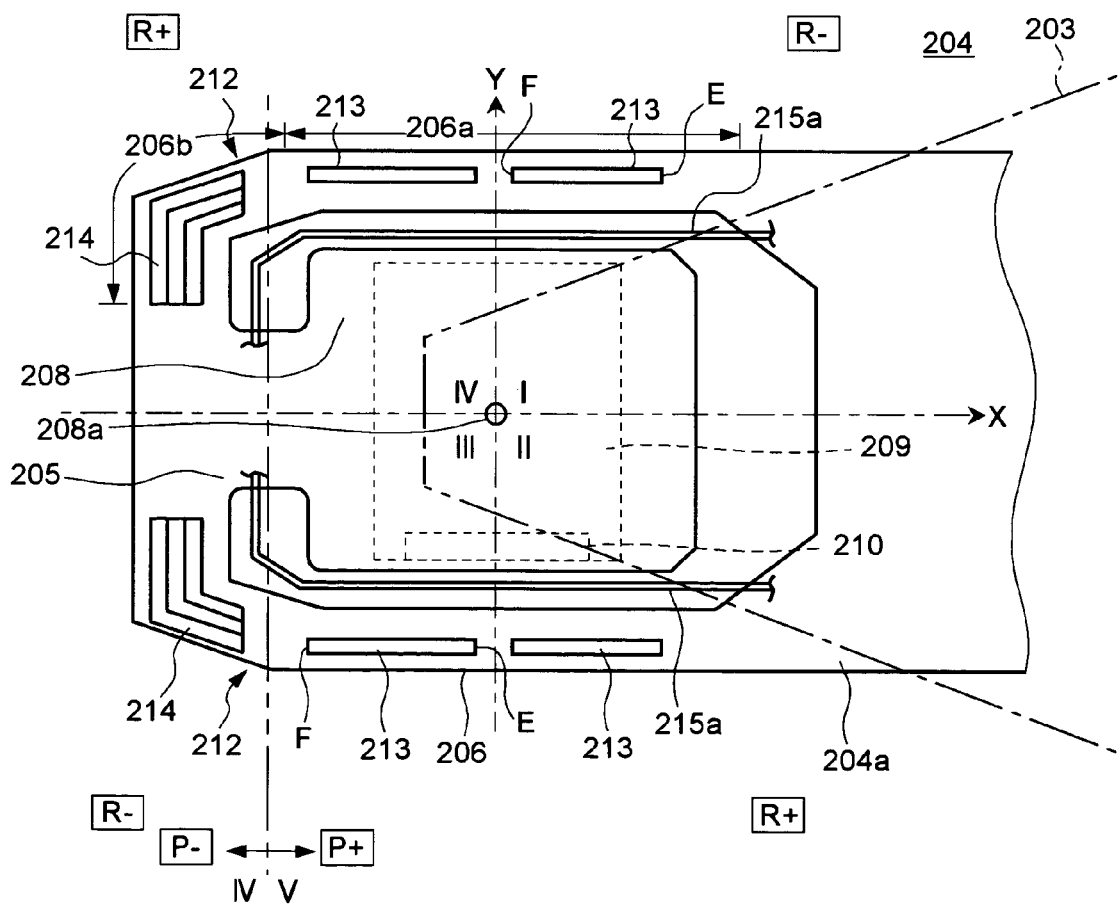
FIG. 6 is an explanatory view of a laser beam irradiation area on an angle adjustment portion of a suspension.

FIG. 5 is an explanatory view of a laser beam irradiation area on the load curve portion of the suspension, and FIG. 6 is an explanatory view of the laser beam irradiation area on the angle adjustment portion of the suspension. The load curve portion 202 is positioned to stride between the base plate 201 and the load beam 203 with two legs, and is formed thin when necessary. A plurality of laser beam irradiation areas 211 are linearly provided in a curved direction of the load curve portion 202 (i.e., a direction perpendicular to a bent or curved edge line when curved). The laser beam irradiation areas 211 mean ranges in which a laser beam can be irradiated. A length and a shape of an irradiation beam are determined within each range as described later. A laser beam is irradiated to the whole or a part of the laser beam irradiation areas 211. A first point F and an end point E of each laser beam irradiation area 211 are accommodated within the load curve portion 202. Only one of the first point F and the end point E may be accommodated within the load curve portion 202. Irradiation of laser beams having four kinds of length, for example, is scheduled in the laser beam irradiation areas 211 within the load curve portion 202. In this case, a suitable length is selected according to a correction level (i.e., a load adjustment amount). The laser beam irradiation areas 211 are symmetrically corrected by curving the suspension 200 in the pitch direction. Although the load curve portion 202 is defined as the laser beam irradiation areas 211, a shape indicated in the drawing is not actually marked in the load curve portion 202. Only the execution of the correction within the correction apparatus 100 is defined.

As shown in FIG. 6, a plurality of laser beam irradiation areas 213 and 214 of an angle adjustment portion 212 are set in the outriggers 206 of the flexure 204. Specifically, the laser beam irradiation areas 213 and 214 are set on linear portions 206a each extending from a root portion 204a of the outrigger 206, and on curve portions 206b each extending from the linear portion 206a to the gimbal spring 205. Similarly, these laser beam irradiation areas 213 and 214 are defined as the angle adjustment portion 212 within the correction apparatus 100, and a marking is not particularly provided. A marking may be provided to allow visual recognition of the laser beam irradiation areas 211, 213, and 214.

The magnetic head mounting portion takes the coordinate XY axis around the center of (in general, a position of the dimple 208a). In this case, when a laser beam is irradiated onto a range I and a range III of the outriggers, the roll angle is corrected in minus. When a laser beam is irradiated onto laser beam irradiation areas of a range II and a range IV of the outriggers, the roll angle is corrected in plus. When a laser beam is irradiated onto a laser beam irradiation area of an area V (i.e., a first area), with the center of the gimbal spring 205 as a boundary, the pitch angle is corrected in plus. When a laser beam is irradiated onto a laser beam irradiation range of an area VI (i.e., a second area), the pitch angle is corrected in minus. Therefore, although it is not possible to correct the pitch angle and the roll angle individually, the roll angle and the pitch angle can be properly corrected when they are combined together.

The suspensions 200 shown in FIG. 4 to FIG. 6 are one example, and it is needless to mention that the laser beam irradiation areas can be provided at portions that rule the load and the angle of the suspension having other shapes. The shapes of the laser beam irradiation areas are determined according to various conditions such as shapes and materials of the suspensions. Therefore, it is not possible to uniquely determine shapes of all the suspensions. Shapes and positions of the laser beam irradiation areas can be set based on experience or by simulation using a computer.

A first point F and an end point E of each of the laser beam irradiation areas 213 and 214 are accommodated within the angle adjustment portion 212. Only one of the first point F and the end point E may be accommodated within the angle adjustment portion 212. As shown in FIG. 6, the laser beam irradiation areas 213 and 214 are set so that they are not superimposed with a wiring area 215a that is located between the outrigger 206 and the magnetic head mounting portion 208. A wiring portion such as a flexible substrate including a patterned copper and insulation layer is disposed in the wiring area 215a, and is actually buoyant from the outrigger 206.

Figure 7:
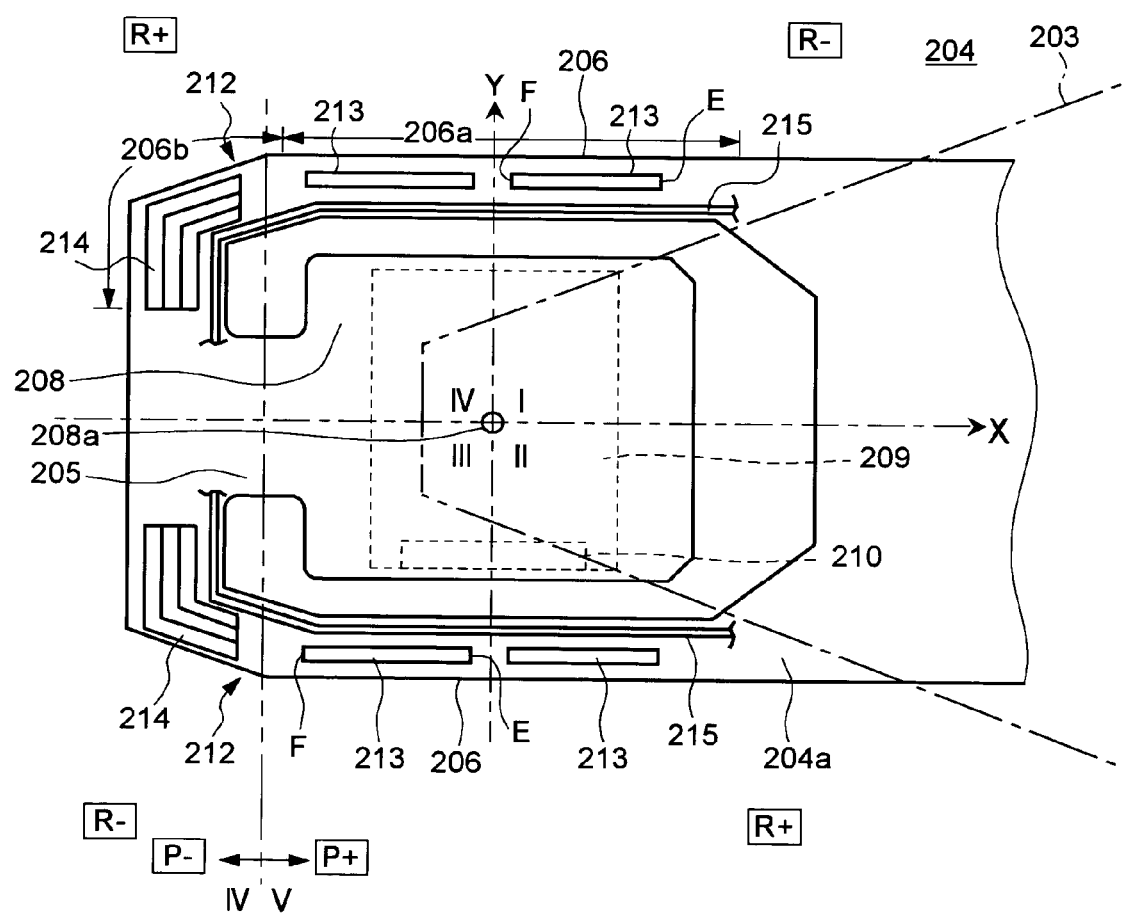
FIG. 7 is an explanatory view of a laser beam irradiation area on an angle adjustment portion of a suspension according to another embodiment.

The irradiation of a laser beam onto the wiring area 215a has a risk of an occurrence of a disconnection or a wiring failure due to an excessive thermal load on the wire. This also has a risk of burning the flexible substrate. When the laser beam irradiation areas 213 and 214 are set keeping out of the wiring area 215a as shown in the drawing, a laser beam is not irradiated onto the wiring area 215a. Therefore, this has an advantage that no inconvenience occurs due to the laser beam. As shown in FIG. 7, depending on the structure, an insulation layer is formed along a longitudinal direction of the outriggers 206 and 206 on the stainless surface of the flexure 204, and a conductor is formed on the insulation layer. This structure also has a problem of an excessive thermal load on the wire. Therefore, it is preferable to set the laser beam irradiation areas 213 and 214 by keeping out of the wiring area 215a as shown in the drawing.

In the present invention, a laser beam is irradiated onto a predetermined portion of the suspension 200, thereby to correct the load and angle by utilizing the thermal deformation. Therefore, it is necessary to acquire in advance thermal deformation due to the laser beam for each of the laser beam irradiation areas 211, 213, and 214. For example, when a laser beam of a predetermined shape and a predetermined length is irradiated onto the laser beam irradiation areas 211, 213, and 214 shown in FIG. 5 and FIG. 6, the displacement of the load curve portion 202 and the angle adjustment portion 212 changes due to the irradiation of the laser beam. This relationship needs to be obtained by experiment or by simulation, and stored in a database. A detailed example of the database is built into the computer 5 shown in FIG. 2. An irradiation shape of the laser beam to carry out a correction based on the load adjustment amount and the angle adjustment amount is registered as a character in the database.

FIG. 8 is an explanatory view of one example of a character when a laser beam irradiation shape is registered as a character. A character of a code C1 represents a laser beam irradiation shape (i.e., the alphabet) that is used when the laser marker 3 is usually used. A code C2 to a code C11 represent characters that are used to correct the suspension by a predetermined load adjustment amount. For example, the character of the code C2 is used to irradiate a laser beam onto a lower left position within a frame of a predetermined size (i.e., laser beam irradiation range). The character of the code C3 is used to irradiate a laser beam onto an upper left position within a frame. The characters of the code C4 to a code C11 are similarly used to irradiate a laser beam onto predetermined positions respectively.

Each of a code C12 to a code C15 represents a combination of characters. For example, the code C12 is a combination of the character 1 and the character 4. The character C12 makes it possible to correct the suspension by a predetermined load adjustment amount or a predetermined angle adjustment amount based on this combination. The code C13 and the code C15 similarly represent combinations of predetermined characters respectively. Based on these combinations, it becomes possible to correct the suspension by a predetermined load adjustment amount or a predetermined angle adjustment amount. Actually, combinations of a plurality of kinds of characters are prepared to cover the whole range of requested load adjustment amounts and angle adjustment amounts, and these character combinations are stored in the load database or the angle database. The suspension is corrected based on these character combinations because the correction of a roll angle (or a pitch angle) using each character substantially unavoidably affects the pitch angle (or the roll angle), making it impossible to individually correct the roll angle or the pitch angle. For this reason, it is necessary to use combinations of a plurality of characters to carry out the correction, thereby to generate optimum characters.

The character combinations are coded and stored in the load database 53 and the angle database 57 respectively. The load character combination selector 54 and the angle character combination selector 58 select these character combinations to adjust the load and the angle respectively. The adder 59 adds character codes, and the character converter 62 converts the added character codes into position data by referring to the character set code. The laser beam irradiation position converter 63 converts the position data into irradiation position data to irradiate a laser beam.

FIG. 9 is a flowchart of a suspension correction process. First, the suspension 200 is held on the conveyer stage 7, and the conveyer stage 7 is moved by a predetermined distance to position the suspension 200 beneath the load measuring unit 1 (step S1). The load measuring unit 1 lowers the probe 12 to press the front end 12*a* of the probe 12 against the magnetic head mounting portion 208, and further pushes the front end 12*a* into the magnetic head mounting portion 208 by a predetermined amount. The load measuring apparatus 1 measures, with the load cell 13, the load applied to the suspension 200 (step S2) and outputs a signal corresponding to the result of the measurement.

The computer 5 receives the signal from the load cell 13. The load adjustment amount calculator 52 in the computer 5 compares this load with a load set value stored in the load set value memory 51, and determines a load (hereinafter, "load adjustment amount") to adjust the load (step S3). The conveyer stage 7 is moved to position the suspension 200 beneath the angle measurer 2 (step S4). A laser beam is irradiated onto the magnetic head mounting portion 208 of the suspension 200. The CCD 17 receives a laser beam that is reflected from the suspension 200. The CCD 17 outputs a signal corresponding to amount of received light. The computer 5 receives the signal and estimates an actual angle of the curvature (step S5).

The angle adjustment amount calculator 56 in the computer 5 compares the angle with an angle set value stored in the angle set value memory 55, and determines an angle (hereinafter, "angle adjustment amount") to adjust the angle (step S6). The load character combination selector 54 selects a plurality of load characters stored in the load database 53 according to the load adjustment amount. Further, the angle character combination selector 58 selects a plurality of angle characters stored in the angle database 57 according to the angle adjustment amount (step S7). The adder 59 adds the load character selected by the load character combination selector 54 and the angle selected by the angle character combination selector 58. In other words, the adder 59 generates a character code to be used to finally correct both the roll angle and the pitch angle of the suspension 200 (step S8). The character combinations are as exemplified in FIG. 8.

The computer 5 sends the character code to the laser marker 3. The character converter 62 of the laser marker 3 converts the character code into a character by referring to the code stored in the character set code memory 61 (step S9). The laser beam irradiation position converter 63 converts the converted character into laser beam irradiation position data (step S10). A laser output amount is selected from the database (step S11), and a laser beam defocus amount is selected from the database (step S12). The laser marker main body 6 drives the laser marker head 20 based on the laser beam irradiation position data, and irradiates a laser beam onto the load curve portion 202 and the angle adjustment portion 212 of the suspension 200 respectively (step S13). The combined characters are sequentially irradiated. As the transmission pitch is "0", substantially a laser beam of the combined shape of the characters is irradiated.

Referring back to FIG. 5 and FIG. 6, the actual laser beam irradiation condition can be understood by experiment. For example, the load change amount in the load curve portion 202 of the suspension shown in FIG. 5 is proportional to a scan length and a number of laser beams. A scan length and a number of irradiation laser beams are defined for each load character combination. A corresponding combination is selected from among necessary load adjustment amounts. The laser beam is irradiated accordingly, which makes it possible to carry out a fast load adjustment. This similarly applies to the angle change amount in the angle adjustment portion shown in FIG. 6. Each angle character combination is proportional to a scan length and a number of laser beams. A corresponding combination of angle characters is selected from among necessary angle adjustment amounts. The laser beam is irradiated accordingly.

Figure 10A:
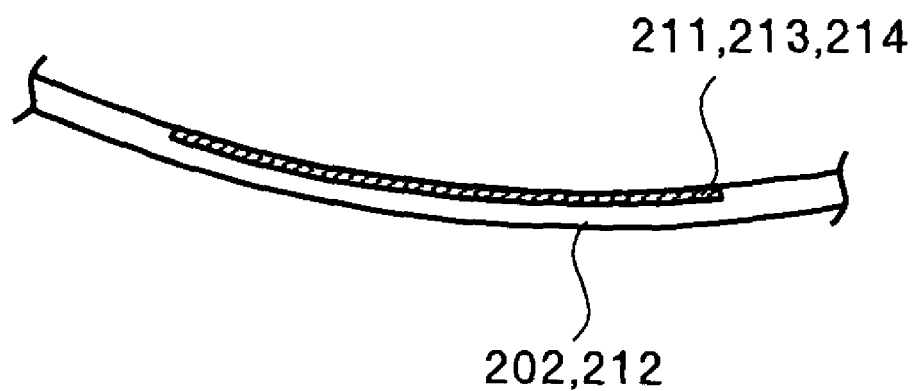
FIGS. 10A and 10B are comparative explanatory views of curved states of a load curve portion and an angle-adjusted portion respectively.
Figure 10B:
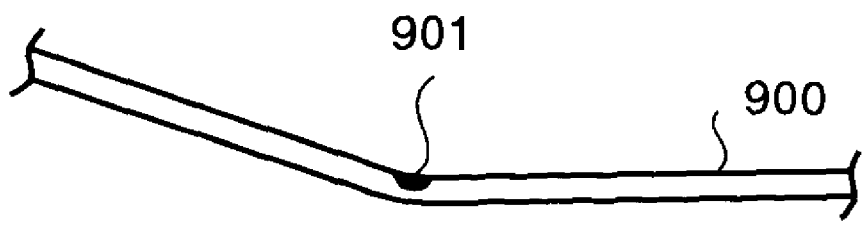

A laser beam of a predetermined length and a predetermined shape is irradiated onto the laser beam irradiation areas 211, 213, and 214 of the load curve portion 202 and the angle adjustment portion 212 respectively. With this arrangement, a laser beam irradiation area including its surrounding is curved as shown in FIG. 10A. In the case of the load curve portion 202 shown in FIG. 5, for example, the laser beam irradiation area is curved at a predetermined curvature in approximately a perpendicular direction with respect to the paper surface. As a result, a portion that is actually irradiated with the laser beam in the laser beam irradiation area 211 is curved as an arc. The laser beam irradiation portion of the angle adjustment portion 212 shown in FIG. 6 is also curved. On the other hand, according to the conventional method of correcting load and an angle, a laser beam is irradiated approximately perpendicularly or in slanting relative to the curve deformation direction. Therefore, as shown in FIG. 10B, a suspension 900 is bent at an angle formed by a laser beam scanning line 901, which involves difficulty in high-precision adjustment. As explained above, by scanning the suspension with a laser beam along a direction of a curve deformation, the suspension can be curved in high precision. Further, according to the conventional method, stress is concentrated onto a laser beam scanning line 901, which involves a risk of breaking the suspension. However, according to the present invention, as the laser beam irradiation portion is curved, the stress concentration due to this deformation is prevented, resulting in no breaking of the suspension. Further, as a laser beam is not irradiated onto the edge portion, the heat of the laser beam is spread to the surrounding. Therefore, it is possible to prevent the occurrence of browning. On the other hand, according to the conventional method, the laser beam scanning line 901 passes through the edge of the load curve portion 202 and the angle adjustment portion 212. As the edge portion has little spread area of the laser beam, browning occurs relatively easily.

As shown in FIG. 5 and FIG. 6, the scanning first point F and the end point E of the laser beam are positioned at optional points of the suspension 200. Therefore, the thermo-mechanical treatment heat spreads to the vicinity of the irradiation surface at the first point F and the end point E. Consequently, there occurs no inconvenience of discoloring or browning in the vicinity of the end portion of the suspension 200. As the laser beam irradiation length can be set to an optional level, it is possible to realize fast high-precision processing by dividing the area of the irradiation position. For example, in FIG. 5, out of ten laser beam irradiation areas 211, internal eight areas are used as coarse adjustment areas, and external two areas are used as fine adjustment areas. In other words, the areas are divided into the coarse adjustment areas and the fine adjustment areas. For example, a high-energy laser beam is fast irradiated onto the coarse adjustment areas, and a relatively low-energy laser beam is accurately irradiated onto the fine adjustment areas. With this arrangement, fast and fine adjustment processing can be carried out in total.

The laser marker head 20 focuses the laser beam from the galvano head with the long focal length lens thereby to obtain a deep depth of focus. Therefore, a change in the energy density of the laser beam can be suppressed even when a distance between the laser marker head 20 and the suspension 200 changes. Accordingly, a fine active control of the focal length of the suspension 200 becomes unnecessary, or a relatively coarse control is sufficient. As a result, the correction apparatus can be structured at low cost. Further, this does not cause the occurrence of inconvenience such as browning due to the excessive energy concentration.

The condenser 23 or the like defocuses the diameter of the laser beam to some extent to adjust the energy density of the laser beam. With this arrangement, a laser beam irradiation damage can be reduced, and the processing speed can be improved. A defocusing level can be suitably determined according to a material and a thickness of the suspension or a laser beam irradiation position. In short, the diameter of the laser beam can be adjusted to such an extent that a laser beam damage such as browning does not occur. It is extremely effective to reduce the laser beam damage when both of the following conditions are satisfied; making a laser beam diameter approximately constant by obtaining a deeper depth of focus with the long focal length lens, and obtaining a relatively large laser beam diameter by defocusing.

Figure 11:
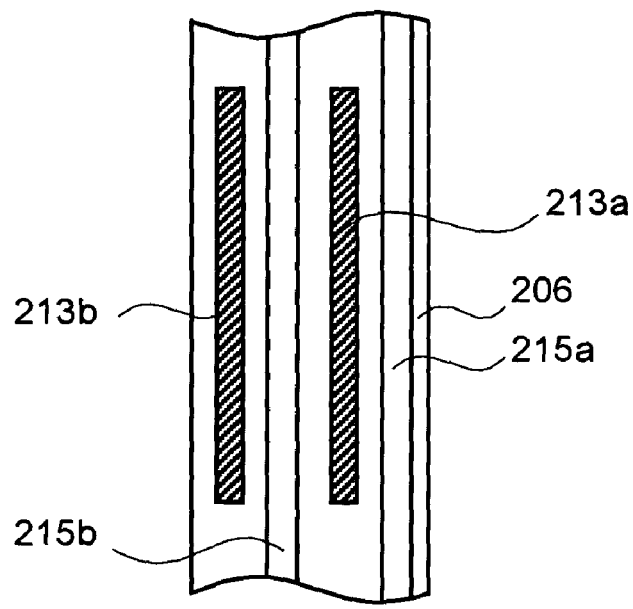
FIG. 11 is an explanatory view of one example of a relationship between a wiring area and a laser beam irradiation area.

When a laser beam is irradiated onto the surrounding of the wiring or between the wires after making small the diameter of the laser beam to be irradiated onto the laser beam irradiation areas 211, 213, and 214, the wires are not badly affected by browning or the like. FIG. 11 is an explanatory view of one example of a relationship between a wiring area 215 and the laser beam irradiation area 213. As shown in FIG. 11, the wiring area 215 is formed on the outrigger 206 of the flexure 204. A laser beam irradiation area 213a is set approximately in parallel with a wire 215a and a wire 215b between these wires. When necessary, a laser beam irradiation area 213b is set between the wire 215b and the end of the outrigger 206. With this arrangement, a laser beam is not irradiated onto the wiring area 215, which prevents the occurrence of browning or a disconnection of the wires 215a and 215b.

Figure 12:
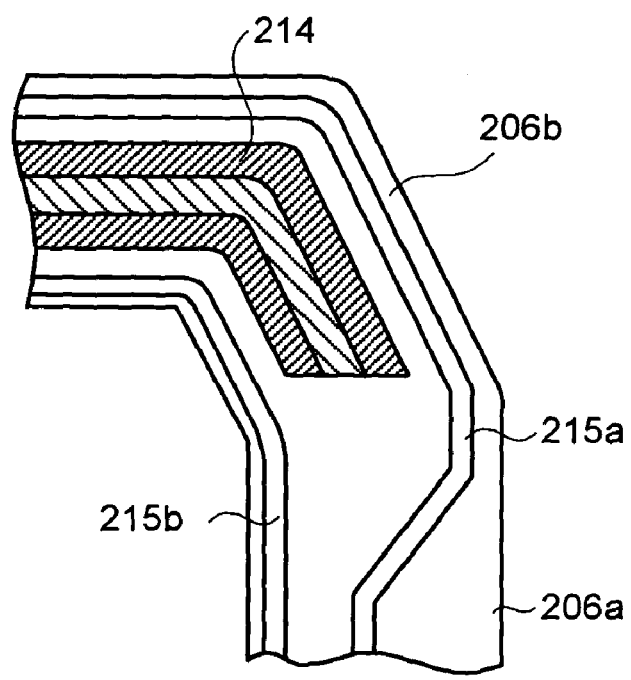
FIG. 12 is an explanatory view of another example of a relationship between a wiring area and a laser beam irradiation area.

Further, as shown in FIG. 12, when the wiring area 215 is present in the linear portion 206a of the outrigger 206 of the flexure 204 and in a curve portion 206b (i.e., the angle adjustment portion 212) reaching from the linear portion 206a to the gimbal spring 205, the laser beam irradiation area 214 may be set along the wire 215a and the wire 215b between these wires. From the other viewpoint, when the laser beam is irradiated, the heat of the laser beam is transmitted to the wiring area 215, particularly because the suspension 200 is made of metal. In this case, the wiring area 215 needs to be separated from the laser beam irradiation areas 213 and 214 to such an extent that this thermal influence does not become a problem. The isolation distance may be determined by experiment or by simulation. When the laser beam irradiation position is deviated due to a shortage of alignment or the like, this may damage the wires. In this case, it is preferable to set the laser beam irradiation areas 213 and 214 by taking this deviation into account.

Further, from the other viewpoint, it is possible to prevent the wires from being badly affected, by setting the laser beam irradiation areas 213 and 214 along the wiring area 215. Further, from the other viewpoint, the laser beam irradiation areas 213 and 214 can be set keeping out of the wiring area 215. These positional relationships between the wiring area and the laser beam irradiation areas can also be applied in a similar manner to other structures than those shown in FIGS. 5, 6, 10, and 11.

Figure 13:
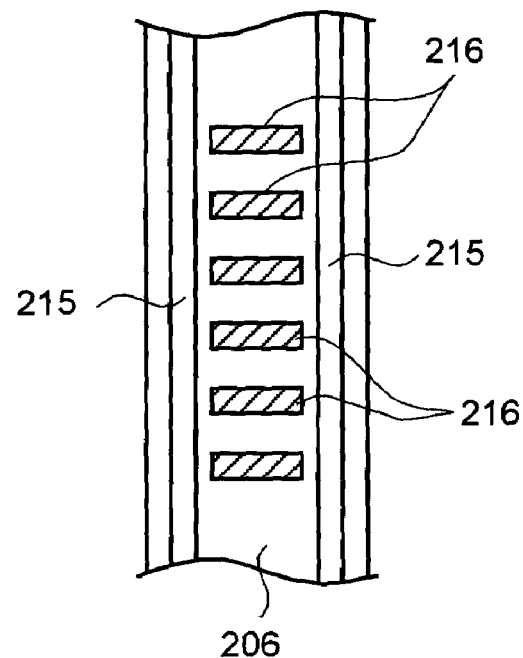
FIG. 13 is an explanatory view of still another example of a relationship between a wiring area and a laser beam irradiation area.

Further, as shown in FIG. 13, laser beam irradiation areas 216 may be set linearly at a constant interval, and a laser beam is irradiated onto these laser beam irradiation areas 216. As a result of the linear irradiation of the laser beam, the load curve portion 202 and the angle adjustment portion 212 are curved approximately in the same manner as that shown in FIG. 10A. In other words, in the present invention, in order to carry out a curve correction in high precision, the laser beam irradiation areas need not be continuous straight lines, and may be substantially linear as shown in FIG. 13. In linearly irradiating a laser beam, the laser beam may be irradiated in a scatter within a laser beam irradiation area set in advance. Alternatively, the laser beam may be irradiated in a wave shape within a laser beam irradiation area set in advance.

Figure 14:
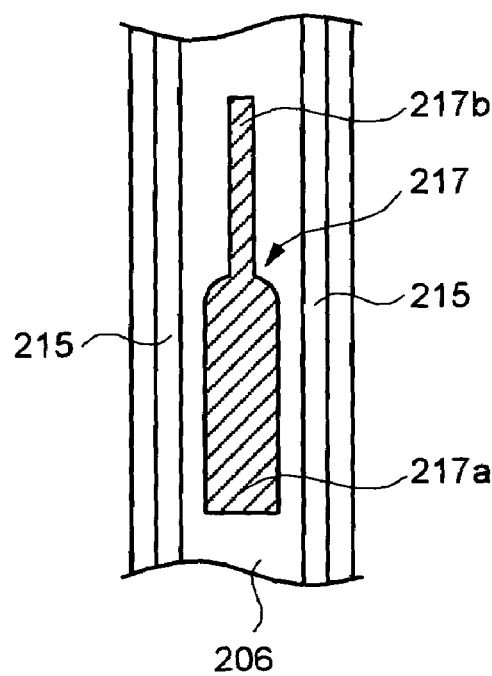
FIG. 14 is an explanatory view of still another example of a relationship between a wiring area and a laser beam irradiation area.

A curve shape may be fine controlled by changing the energy of the laser beam during a laser beam scanning. For example, as shown in FIG. 14, the diameter of the laser beam may be changed by controlling the focus of the laser beam, thereby to change the irradiation width of the laser beam to be irradiated onto the outrigger 206 (corresponding to the laser beam irradiation area 217). With this arrangement, the curvature of a portion 217a having a large irradiation width can be made large, and the curvature of a portion 217b having a small irradiation width can be made small. By differentiating between these curvatures, a finer curving can be achieved. Further, the energy density of the laser beam may be changed without changing the laser beam diameter, thereby to adjust the output. With this arrangement, as the energy is not concentrated to one point, and the output can be changed in a predetermined laser beam diameter, browning does not occur.

According to the suspension correction apparatus 100, the load measuring unit 1 and the angle measuring unit 2 measure the load and the angle of the suspension 200 respectively at the upstream of the correction process, as shown in FIG. 1. In order to measure the load and the angle after the correction, the load measuring unit 1 and the angle measuring unit 2 may be further provided at the downstream of the laser marker head 20 (not shown). The load measuring unit 1 and the angle measuring unit 2 disposed at the downstream can decide whether the correction is carried out properly. When the correction is not sufficient, the load and the angle may be measured again. In the structure shown in FIG. 1, the conveyer stage 7 may be returned to the reverse direction after the correction, and the load measuring unit 1 and the angle measuring unit 2 disposed at the upstream can measure the load the angle again.

Figure 15:
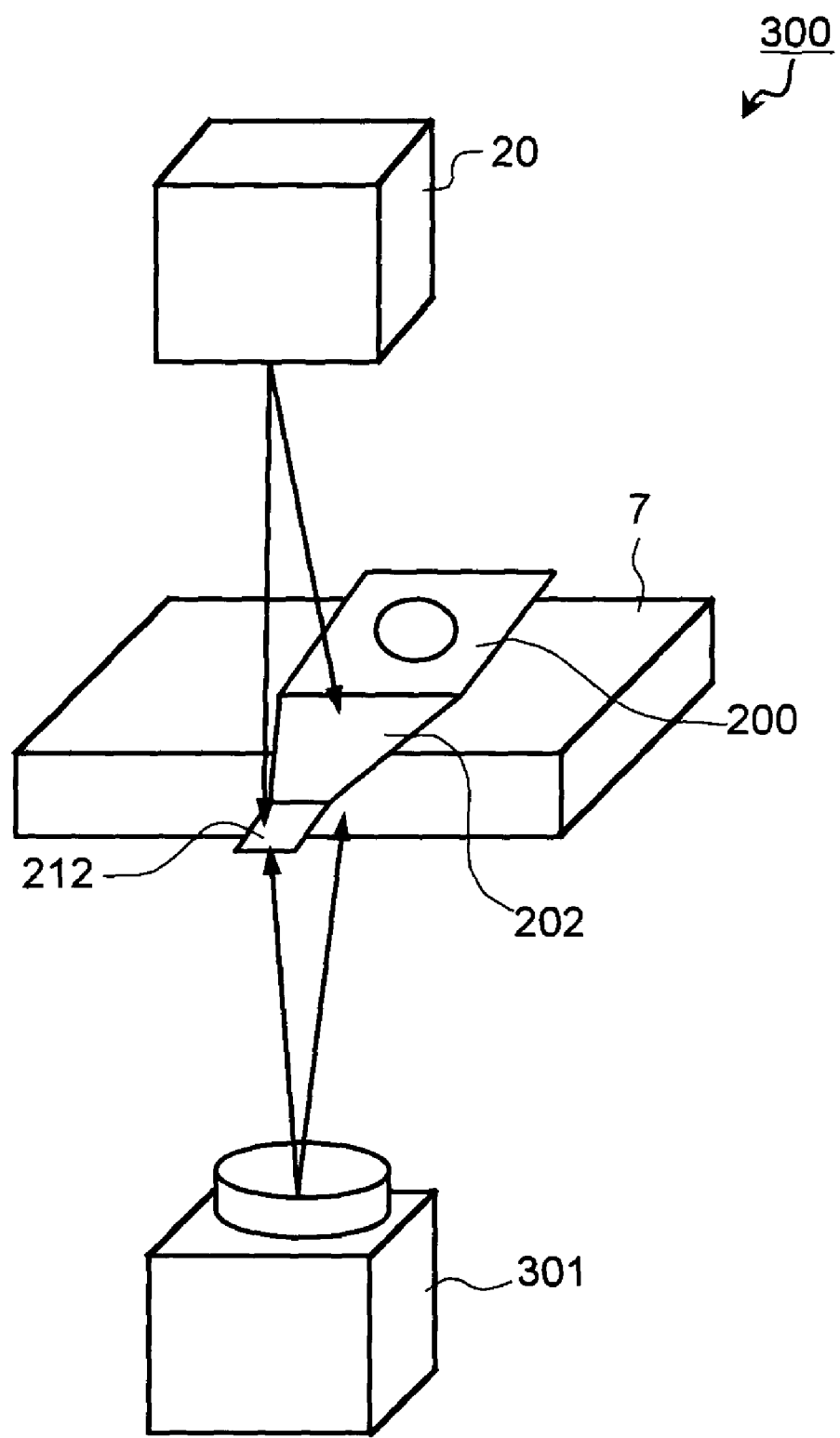
FIG. 15 is a structure diagram of a suspension correction apparatus according to the second embodiment of the present invention.

FIG. 15 is a structure diagram of a suspension correction apparatus 300 according to a second embodiment of the present invention. The suspension correction apparatus 300 has laser marker heads 20 and 301 disposed both above and below the suspension 200 respectively, with other structures remain unchanged from those of the suspension correction apparatus 100 according to the first embodiment. Therefore, the explanation of the other structures is omitted. As described above, when the laser beam is irradiated onto the load curve portion 202 and the angle adjustment portion 212 of the suspension 200 respectively, the curve deformation portion may be excessively corrected depending on the irradiation state of the laser beam. In this case, the second laser marker head 301 disposed opposite to the first laser marker head 20 irradiates the laser beam onto the opposite surface of the load curve portion 202 and the angle adjustment portion 212 respectively. With this arrangement, the load curve portion 202 and the angle adjustment portion 212 are curved in a direction opposite to the once curved direction. This negative correction cancels the excessive correction. When the laser beam is irradiated onto the opposite surface, the correction range can be enlarged as compared with when the laser beam is irradiated from only one direction.

The second laser marker may be located at the same side as the first laser marker head, instead of at the opposite side. After the first laser marker head irradiates, the suspension is vertically inverted, and then the second laser marker head irradiates (not shown). Alternatively, the first laser marker head first irradiates, and the suspension vertically inverts and is conveyed to the position of the first laser marker head again. Then, the first laser marker head irradiates. In this case, the second laser marker is not necessary.

Figure 16:
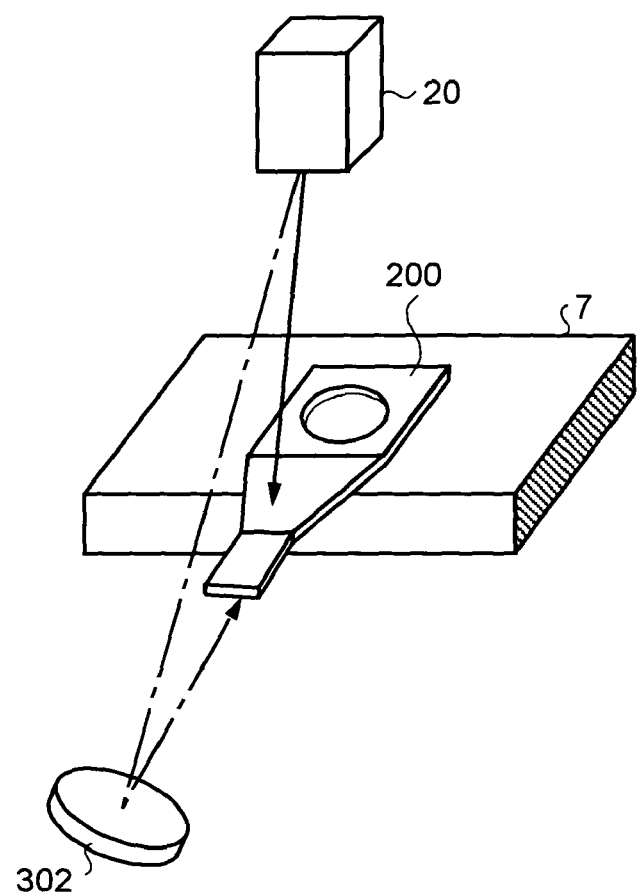
FIG. 16 is a structure diagram of a modification of the suspension correction apparatus shown in FIG. 14.

Instead of using the two laser marker heads as described above, one laser marker head 20 may be used as exemplified by a modification in FIG. 16. A reflection mirror 302 is provided at the opposite side of the suspension 200, thereby to reflect the laser beam from the laser marker head 20, and irradiate the laser beam to the rear surface of the load curve portion 202 and the angle adjustment portion 212 respectively. While the laser marker head 20 can preferably carry out the laser scanning, the reflection mirror 302 may carry out the scanning instead.

Figure 17:
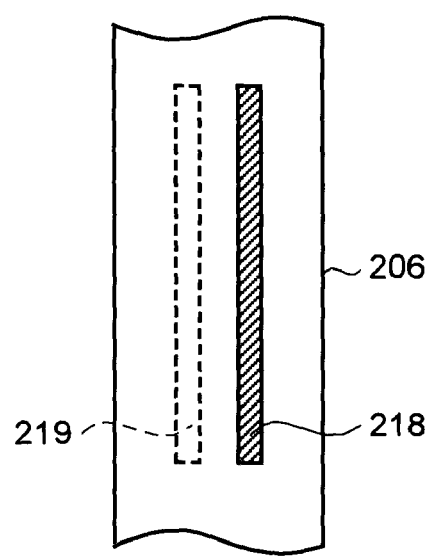
FIG. 17 is an explanatory view of a layout of a laser beam irradiation area.

The load curve portion 202 and the angle adjustment portion 212 are formed with thin plates. Therefore, when a laser beam is irradiated onto the same position on both sides of the load curve portion 202 and the angle adjustment portion 212 respectively, curve deformation may not be achieved as expected because of superimposition of thermally influenced portions of the material. In this case, as shown in FIG. 17, it is preferable that laser beam irradiation areas are set at different positions of both sides of the load curve portion 202 and the angle adjustment portion 212 respectively. A solid line represents a laser beam irradiation area 218 on the front surface, and a dotted line represents a laser beam irradiation area 219 on the rear surface.

While the suspension is explained as the object to be corrected by the suspension correction apparatus in the above, it is needless to mention that the suspension correction apparatus can correct other objects as well. Specifically, the suspension correction apparatus can preferably correct an object that requires a fine correction of both or either one of a pitch angle and a roll angle. For example, the suspension correction apparatus can correct an optical axis of a cantilever probe of an atomic force microscope that uses a metal plate, an optical head and optical communication connector, a micro contactor, etc.

In the first and second embodiments, the laser marker 3 is used to carry out the laser beam irradiation. However, when this character is programmed, it is not necessary to use the commercially available laser marker 3.

While the load adjustment and the angle adjustment are carried out at the same time in the above embodiments, only one of these adjustments may be carried out. In this case, a character combination may be selected based on the obtained load adjustment amount or angle adjustment amount.

As explained above, according to one aspect of the present invention, the thin plate formation method makes it possible to achieve a fine curve formation. This method also makes it possible to adjust the load of the suspension easily and in high precision.

According to another aspect of the present invention, the thin plate becomes a proper product that is curved in high precision. According to still another aspect of the present invention, the suspension correction apparatus can fine control the load and the angle of the suspension.

According to still another aspect of the present invention, the suspension correction apparatus can irradiate a laser beam of a specific irradiation shape onto the suspension relatively easily. According to still another aspect of the present invention, the suspension correction apparatus has two separate laser beam irradiating units provided to sandwich the suspension. Therefore, the correction range can be enlarged.

Although the invention has been described with respect to a specific embodiment for a complete and clear disclosure, the appended claims are not to be thus limited but are to be construed as embodying all modifications and alternative constructions that may occur to one skilled in the art which fairly fall within the basic teaching herein set forth.

What is claimed is:

1. A suspension correction method of adjusting an angle of the suspension by irradiating a laser beam onto a laser beam irradiation area for correcting a roll angle in a positive direction or a laser beam irradiation area, between a first point and an end point, for correcting a roll angle in a negative direction, based on an arrangement that the suspension is formed in a thin plate shape as a whole, the header is connected to an outrigger from one end of a head mounting portion via a spring, and the outrigger consists of a curve portion reaching both sides of the head mounting portion, and a linear portion that continues from the curve portion, and an XY axis is set around the head mounting portion, a plurality of areas I, II, III, and IV are formed on the XY coordinates with the X axis as a gimbal longitudinal direction, and the laser beam irradiation area for correcting the roll angle in the positive direction or the laser beam irradiation area for correcting the roll angle in the negative direction is set in the area I and the area III or the area II and the area IV, respectively, wherein the laser beam is polarized in XY directions with a galvano scanner mirror and is condensed with a long focal length lens, and wherein the laser beam irradiation area irradiated by the laser beam curves about an imaginary line that is perpendicular to a direction along which the laser beam travels.

2. The suspension correction method according to claim 1, wherein the irradiation shape includes first and second portions that are connected to each other and extend in first and second directions, respectively.

* * * * *